US012780014B2

(12) United States Patent
Lundin

(10) Patent No.: US 12,780,014 B2
(45) Date of Patent: Nov. 3, 2026

(54) BATTERY PACK SYSTEM, CHASSIS ARRANGEMENT, ELECTRIFIED HEAVY-DUTY VEHICLE AND METHOD

(71) Applicant: VOLVO TRUCK CORPORATION, Gothenburg (SE)

(72) Inventor: Robert Lundin, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 443 days.

(21) Appl. No.: 18/445,459

(22) Filed: Aug. 31, 2023

(65) Prior Publication Data

US 2024/0075821 A1 Mar. 7, 2024

(30) Foreign Application Priority Data

Sep. 2, 2022 (EP) .................................... 22193665

(51) Int. Cl.

*B60L 50/64* (2019.01)
*B60L 50/60* (2019.01)
*H01M 50/209* (2021.01)
*H01M 50/264* (2021.01)

(52) U.S. Cl.

CPC ............... *B60L 50/64* (2019.02); *B60L 50/66* (2019.02); *H01M 50/209* (2021.01); *H01M 50/264* (2021.01); *B60L 2200/18* (2013.01); *B60L 2200/36* (2013.01); *B60L 2200/40* (2013.01); *H01M 2220/20* (2013.01)

(58) Field of Classification Search

CPC ........... B60L 50/64; B60K 2001/0444; H01M 50/262; H01M 50/264

See application file for complete search history.

(56) References Cited

U.S. PATENT DOCUMENTS

| | | | | |
|---|---|---|---|---|
| 11,043,714 | B2 * | 6/2021 | Sloan | B60K 1/04 |
| 11,312,221 | B2 * | 4/2022 | Sloan | B60L 50/66 |
| 12,434,593 | B2 * | 10/2025 | Li | B60L 53/80 |
| 2013/0224524 | A1 | 8/2013 | Nam et al. | |
| 2017/0025653 | A1 * | 1/2017 | March | H01M 50/289 |
| 2018/0034014 | A1 | 2/2018 | Ichikawa et al. | |
| 2019/0326569 | A1 | 10/2019 | Chi et al. | |

(Continued)

FOREIGN PATENT DOCUMENTS

| | | | |
|---|---|---|---|
| EP | 3570347 | A1 | 11/2019 |
| EP | 3641004 | A1 | 4/2020 |

(Continued)

OTHER PUBLICATIONS

Extended European Search Report in corresponding European Application No. 22193665.1 dated Feb. 17, 2023 (7 pages).

*Primary Examiner* — Brian L Swenson

(74) *Attorney, Agent, or Firm* — Jeffri A. Kaminski; Venable LLP

(57) ABSTRACT

A battery pack system includes a first battery pack including a first casing and a plurality of battery modules arranged inside the first casing; a second battery pack including a second casing and a plurality of battery modules arranged inside the second casing; and a coupling including a first coupling member fixed to the first casing, and a second coupling member fixed to the second casing, the first coupling member being configured to mate with the second coupling member; wherein the coupling is configured to transfer torques and translational forces.

13 Claims, 11 Drawing Sheets

(56) References Cited

U.S. PATENT DOCUMENTS

| | | | | |
|---|---|---|---|---|
| 2019/0363321 | A1 | 11/2019 | Lee | |
| 2021/0380001 | A1* | 12/2021 | Hörder | H01M 10/6568 |
| 2022/0097554 | A1 | 3/2022 | Hickey | |
| 2022/0126706 | A1* | 4/2022 | Ragot | B60L 50/66 |
| 2025/0323371 | A1* | 10/2025 | Ringstad | H01M 50/264 |

FOREIGN PATENT DOCUMENTS

| | | | |
|---|---|---|---|
| JP | 2010225337 | A | 10/2010 |
| JP | 2012164463 | A | 8/2012 |
| KR | 20140008123 | A | 1/2014 |

* cited by examiner

BATTERY PACK SYSTEM, CHASSIS ARRANGEMENT, ELECTRIFIED HEAVY-DUTY VEHICLE AND METHOD

TECHNICAL FIELD

The disclosure relates generally to battery packs. In particular aspects, the disclosure relates to a battery pack system, a chassis arrangement, an electrified heavy-duty vehicle and a method of assembling a battery pack system. The disclosure can be applied in heavy-duty vehicles, such as trucks, buses, and construction equipment. Although the disclosure may be described with respect to a particular vehicle, the disclosure is not restricted to any particular vehicle.

BACKGROUND

An electrified heavy-duty vehicle may comprise a plurality of battery packs. Each battery pack may comprise a plurality of battery modules. Each battery module may in turn comprise a plurality of battery cells. The battery packs may be used to provide the electrified heavy-duty vehicle with electric energy, such as for propulsion. A plurality of battery packs may be docked to each other to form a battery pack system.

SUMMARY

According to a first aspect of the disclosure, there is provided a battery pack system comprising a first battery pack including a first casing and a plurality of battery modules arranged inside the first casing; a second battery pack including a second casing and a plurality of battery modules arranged inside the second casing; and a coupling including a first coupling member fixed to the first casing, and a second coupling member fixed to the second casing, the first coupling member being configured to mate with the second coupling member; wherein the coupling is configured to transfer torques and translational forces between the first battery pack and the second battery pack.

The first aspect of the disclosure may seek to provide a battery pack system enabling the first battery pack to be easily docked to the second battery pack, where the battery pack system is less sensitive to tolerance variations of components of the battery pack system. Alternatively, or in addition, the first aspect of the disclosure may seek to provide a battery pack system enabling a simplified assembly and/or disassembly of the first battery pack and the second battery pack.

Due to the coupling being configured to transfer torques and translational forces, the coupling may provide an efficient docking system for docking the first battery pack to the second battery pack. When the first battery pack is docked to the second battery pack, the first battery pack and the second battery pack may form a battery pack bundle.

The coupling may simplify assembly and/or disassembly of two or more battery packs. Alternatively, or in addition, the coupling may simplify handling of bundled battery packs comprising two or more battery packs.

The coupling may require only a relatively small area for mounting on each of the first casing and the second casing. Alternatively, or in addition, the coupling may enable a cost efficient design of the battery pack system.

The first coupling member and the second coupling member may be coupled by an interference fit.

In some examples, the coupling is configured to define an unequivocal relative positioning of the first coupling member and the second coupling member when the first battery pack is at least substantially aligned with the second battery pack, such as angled less than 20 degrees relative to each other. That is, the coupling may be configured such that the first coupling member and the second coupling member can only mate in one single relative position when the first battery pack is at least substantially aligned with the second battery pack.

Each battery module may comprise a plurality of battery cells, such as at least 100 battery cells.

In some examples, the first casing comprises a first wall and the second casing comprises a second wall. In this case, the first coupling member may be fixed to the first wall and the second coupling member may be fixed to the second wall.

In some examples, the coupling comprises a plurality of ridges and a plurality of associated splines. In this case, each ridge may be configured to mate with a unique associated spline when the first coupling member mates with the second coupling member. For example, the first coupling member may comprise the plurality of ridges and the second coupling member may comprise the plurality of splines. In this case, the first coupling member and the second coupling member may be said to be a male coupling member and a female coupling member, respectively.

In some examples, the plurality of splines comprises one or more first splines and one or more second splines. In this case, the one or more second splines may be angled 10 degrees to 170 degrees to the one or more first splines, such as 50 degrees to 130 degrees, such as 90 degrees. This may prevent both relative rotations and translational movements between the first battery pack and the second battery pack.

In some examples, the first coupling member is configured to mate with the second coupling member in a mating interface. The coupling may be configured to transfer torques and translational forces through the mating interface. The torques may act around one or more axes transverse to the mating interface. The translational forces may act in parallel with the mating interface.

In some examples, the splines are parallel with the mating interface. In this case, also the ridges may be parallel with the mating interface.

In some examples, the battery pack system further comprises a lock device configured to prevent separation between the first coupling member and the second coupling member. The lock device may be configured to contact and engage each of the first casing and the second casing.

In some examples, the lock device is configured to clamp the first casing and the second casing together.

In some examples, the coupling is hollow and the lock device passes through the coupling. When the lock device passes through the coupling, a tension force induced in the lock device may not generate any moment on the coupling. This example may therefore provide a very reliable clamping of the coupling. The lock device of this example may also pass through each of the first battery pack and the second battery pack.

The lock device may comprise an elongated element passing through the coupling. The elongated element may be a rod or a wire. The lock device may further comprise a clamping element acting on each end of the elongated element to provide the tension force in the elongated element to clamp the first casing and the second casing together. In some examples, the lock device comprises an elongated element not necessarily passing through the coupling. The elongated element in such lock device may pass along, sides and/or edges of the first casing and the second casing.

In some examples, the first casing comprises a first engageable structure parallel with the mating interface and the second casing comprises a second engageable structure parallel with the mating interface. In this case, the lock device may comprise an elongated locking profile configured to engage each of the first engageable structure and the second engageable structure. This example may enable prevention of separation between the first coupling member and the second coupling member very easily, for example by merely inserting the locking profile vertically to engage each of the first engageable structure and the second engageable structure. Also the locking profile of this example may thus contribute to a simplified assembly and/or disassembly of the first battery pack and the second battery pack. For example, the locking profile may have a design of low complexity and/or may be cost efficient. The lock device may also comprise the first engageable structure and the second engageable structure. Each of the first engageable structure and the second engageable structure may comprise one or more slots.

The locking profile may be elongated to define a longitudinal axis. In some examples, the locking profile has a constant cross-sectional profile along a major length, such as the entire length, of the longitudinal axis. The locking profile may be extruded. The locking profile may for example be made of aluminum.

According to a second aspect of the disclosure, there is provided a chassis arrangement for an electrified heavy-duty vehicle, the chassis arrangement comprises a chassis frame including at least one rail extending in a longitudinal direction of the electrified heavy-duty vehicle; and a battery pack system according to the first aspect connected to the at least one rail. The battery pack system may be directly or indirectly connected to the at least one rail.

According to a third aspect of the disclosure, there is provided an electrified heavy-duty vehicle comprising a chassis arrangement according to the second aspect.

According to a fourth aspect of the disclosure, there is provided a method of assembling a battery pack system, the method comprising providing a first battery pack including a first casing and a plurality of battery modules arranged inside the first casing; providing a second battery pack including a second casing and a plurality of battery modules arranged inside the second casing; providing a coupling including a first coupling member fixed to the first casing, and a second coupling member fixed to the second casing, the coupling being configured to transfer torques and translational forces when the first coupling member mates with the second coupling member; and moving the first casing relative to the second casing such that the first coupling member mates with the second coupling member. The method may comprise providing a battery pack system of any type according to the first aspect of the disclosure.

In some examples, the method further comprises arranging a lock device to prevent separation between the first coupling member and the second coupling member. The lock device may be of any type according to the first aspect of the disclosure.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

A battery pack may comprise a plurality of battery modules and each battery module may in turn comprise a plurality of battery cells. A plurality of battery packs may be used to provide an electrified heavy-duty vehicle with electric energy, such as for propulsion. In order to dock a first battery pack to a second battery pack, a plurality of pairs of holes and pins may be used. For example, a plurality of holes may be provided on the first battery pack and a plurality of pins, each for mating with one of the holes, may be provided on the second battery pack. The holes may be manually drilled in the first, battery pack and/or the pins may be manually welded onto the second battery pack. In order to provide a rigid docking between the first battery pack and the second battery pack, a relatively high number of such hole/pin pairs is needed. Such concept is however very sensitive to tolerance variations. For example, if only one of the holes and the pins is outside a given tolerance variation, the first battery pack cannot be docked to the second battery pack. Furthermore, the plurality of hole/pin pairs may require occupation of relatively large surfaces on the first battery pack and the second battery pack. Moreover, if the hole/pin pairs are provided at an assembly site, the provision and mating of the hole/pin pairs add time to the assembly process.

By providing a coupling comprising a first coupling member fixed to a first casing of a first battery pack and a second coupling member fixed to a second casing of a second battery pack, where the coupling can prevent relative rotations and relative translational movements between the first battery pack and the second battery pack, a, battery pack system may be made less sensitive to tolerances and assembly/disassembly may be made more efficient.

Figure 1:
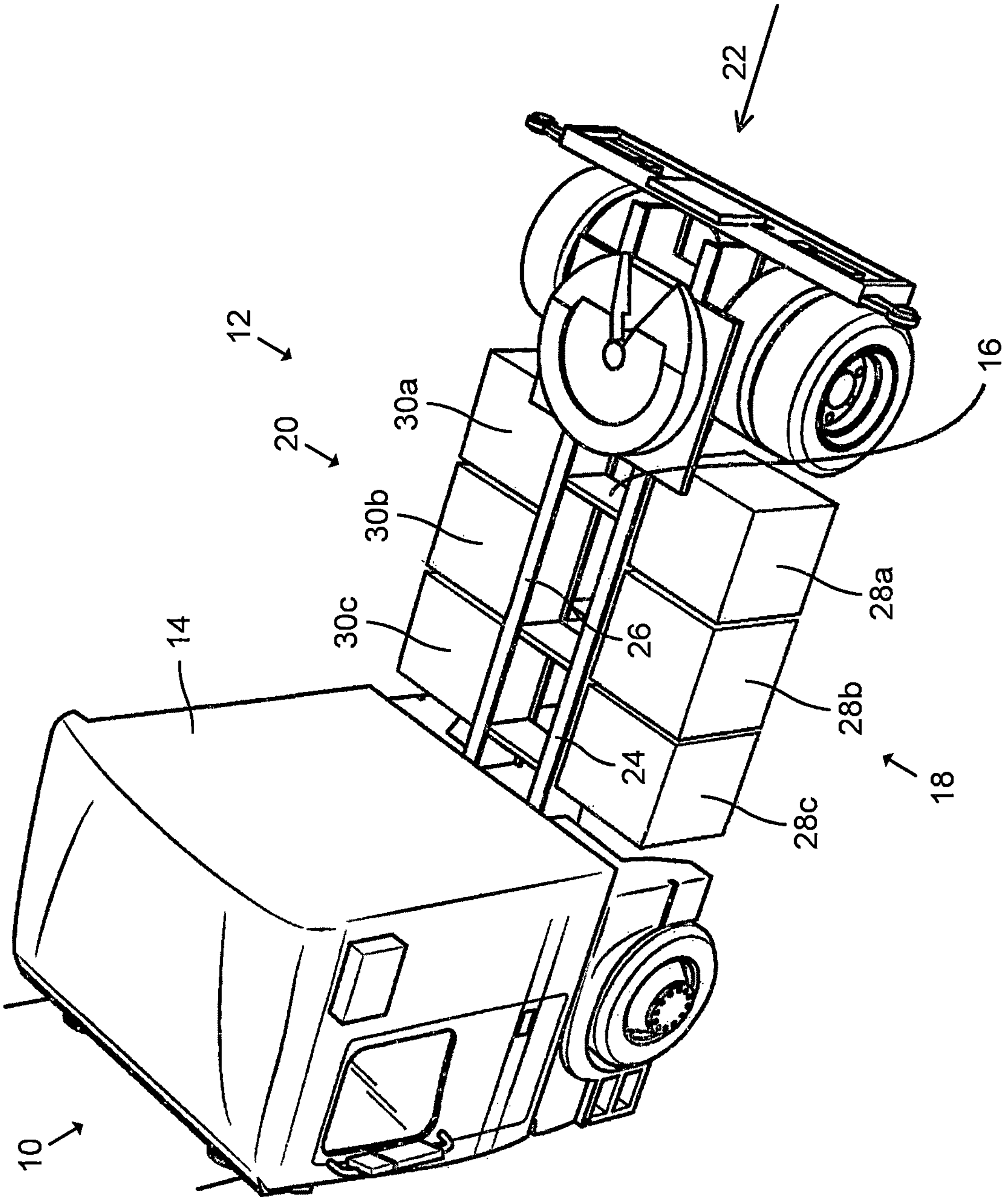
FIG. 1 schematically represents a perspective view of an electrified heavy-duty vehicle comprising a chassis arrangement according to one example.

FIG. 1 schematically represents a perspective view of an electrified heavy-duty vehicle, here exemplified as a truck 10. The truck 10 comprises a chassis arrangement 12 and a vehicle body 14 supported by the chassis arrangement 12. The chassis arrangement 12 of this example comprises a chassis frame 16 and one or more battery pack systems, here a primary battery pack system 18 and a secondary battery pack system 20. FIG. 1 also shows a longitudinal direction 22 of the truck 10. The longitudinal direction 22 corresponds to a forward travel direction of the truck 10.

The chassis frame 16 of this example comprises a primary rail 24 and a secondary rail 26. Each of the primary rail 24 and the secondary rail 26 extends in the longitudinal direction 22. Each of the primary battery pack system 18 and the secondary battery pack system 20 may be fixed to the chassis frame 16.

In FIG. 1, each of the primary battery pack system 18 and the secondary battery pack system 20 is a battery pack bundle. The primary battery pack system 18 and the secondary battery pack system 20 are here a left-hand side battery pack system and a right hand-side battery pack system, respectively, with respect to the longitudinal direction 22.

The primary battery pack system 18 comprises a plurality of primary battery packs, here a primary first battery pack 28*a*, a primary second battery pack 28*b* and a primary third battery pack 28*c*. Correspondingly, the secondary battery pack system 20 comprises a plurality of secondary battery packs, here a secondary first battery pack 30*a*, a secondary second battery pack 30*b* and a secondary third battery pack 30*c*. One, several or all of the primary first battery pack 28*a*, the primary second battery pack 28*b* and the primary third battery pack 28*c* may also be referred to with reference numeral "28". One, several or all of the secondary first battery pack 30*a*, the secondary second battery pack 30*b* and the secondary third battery pack 30*c* may also be referred to with reference numeral "30".

Each of the primary battery pack system 18 and the secondary battery pack system 20 may be assembled remotely from the truck 10. That is, the primary battery pack system 18 may be provided remotely from the truck 10, by docking a plurality of primary battery packs 28 to each other, and the secondary battery pack system 20, may be provided remotely from the truck 10 by docking a plurality of secondary battery packs 30 to each other. The primary battery pack system 18 and the secondary battery pack system 20 may then be mounted to the chassis frame 16. Thus, the truck 10 may comprise a plurality of (here two) pre-assembled battery pack systems 18 and 20. Each battery pack 28 may have a mass of at least 50 kg, such as at least 100 kg, such as 130 kg.

Figure 2:
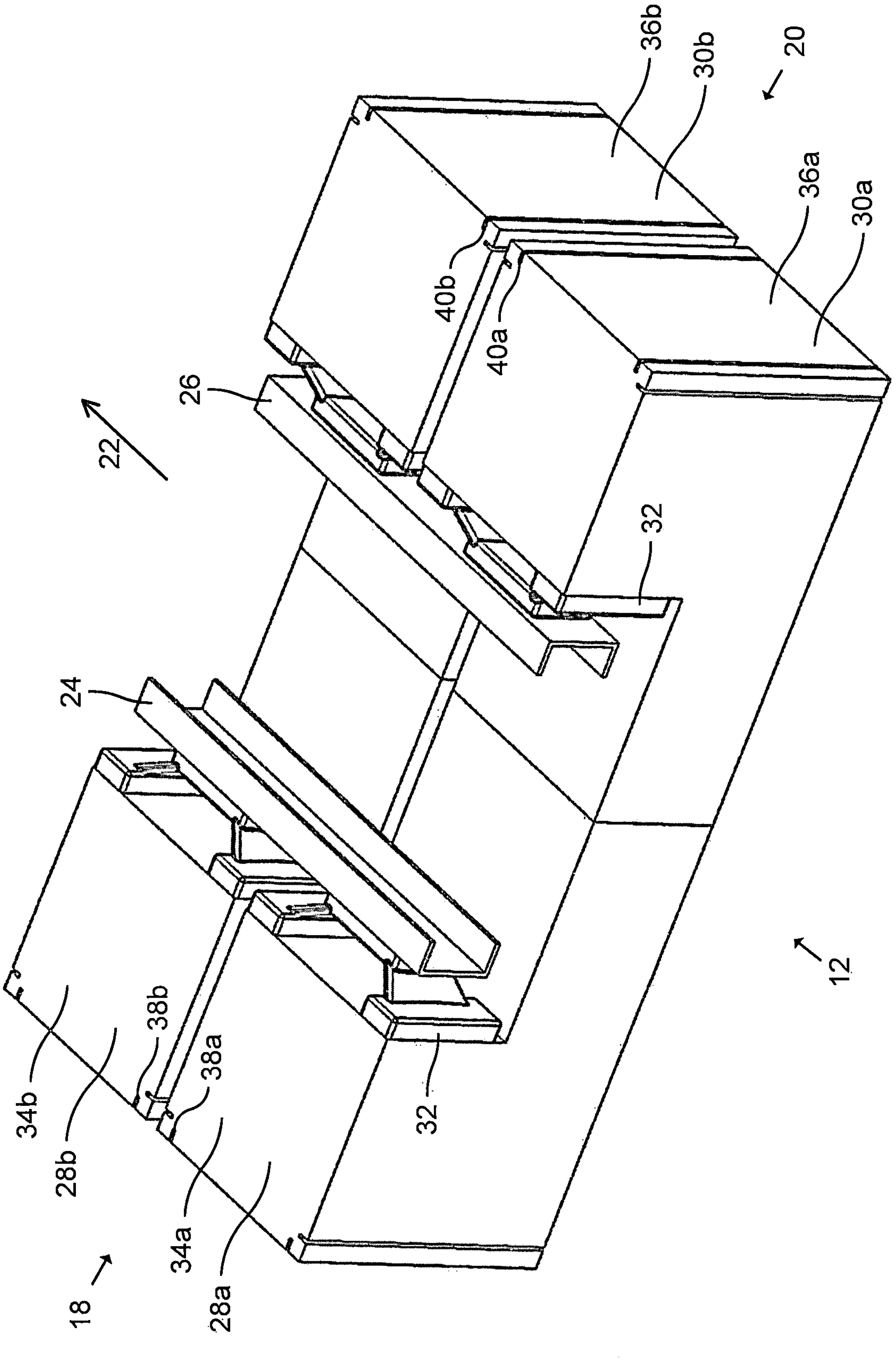
FIG. 2 schematically represents a partial perspective view of the chassis arrangement comprising two battery pack systems according to one example.

FIG. 2 schematically represents a partial perspective view of the chassis arrangement 12. In FIG. 2, only the primary first battery pack 28*a* and the primary second battery pack 28*b* of the primary battery pack system 18 and only the secondary first battery pack 30*a* and the secondary second battery pack 30*b* of the secondary battery pack system 20 are shown. Thus, only two pairs of a primary battery pack 28 and a secondary battery pack 30 are shown in FIG. 2. The chassis arrangement 12 may however comprise two or more pairs of a primary battery pack 28 and a secondary battery pack 30. The primary battery pack system 18 may comprise only two primary battery packs 28, or more than two primary battery packs 28, and the secondary battery pack system 20 may comprise only two secondary battery packs 30, or more than two secondary battery packs 30.

The primary battery pack system 18 may be fixed to the primary rail 24 and the secondary battery pack system 20 may be fixed to the secondary rail 26, for example by welding and/or by fasteners. Damping elements 32 may be provided between the primary rail 24 and each primary battery pack 28, and between the secondary rail 26 and each secondary battery pack 30. The primary battery pack system 18 and the secondary battery pack system 20 may also be fixed to each other, for example by welding and/or by fasteners.

As shown in FIG. 2, the primary first battery pack 28*a* comprises a primary first casing 34*a* and the primary second battery pack 28*b* comprises a primary second casing 34*b*. Correspondingly, the secondary first battery pack 30*a* comprises a secondary first casing 36*a* and the secondary second battery pack 30*b* comprises a secondary second casing 36*b*. In this example, the primary first casing 34*a* comprises a primary first engageable structure 38*a* and the primary second casing 34*b* comprises a primary second engageable structure 38*b*. Correspondingly, in this example, the secondary first casing 36*a* comprises a secondary first engageable structure 40*a* and the secondary second casing 36*b* comprises a secondary second engageable structure 40*b*.

The primary battery pack system 18 and the secondary battery pack system 20 have corresponding designs. As shown in FIG. 2, the design of the secondary battery pack system 20 is mirrored with respect to the design of the primary battery pack system 18. In the following, mainly the primary battery pack system 18 will be described. The wording "primary" will therefore not always be used in connection with components of the primary battery pack system 18. Any definition described in connection with the primary battery pack system 18 also applies to the secondary battery pack system 20.

Figure 3:
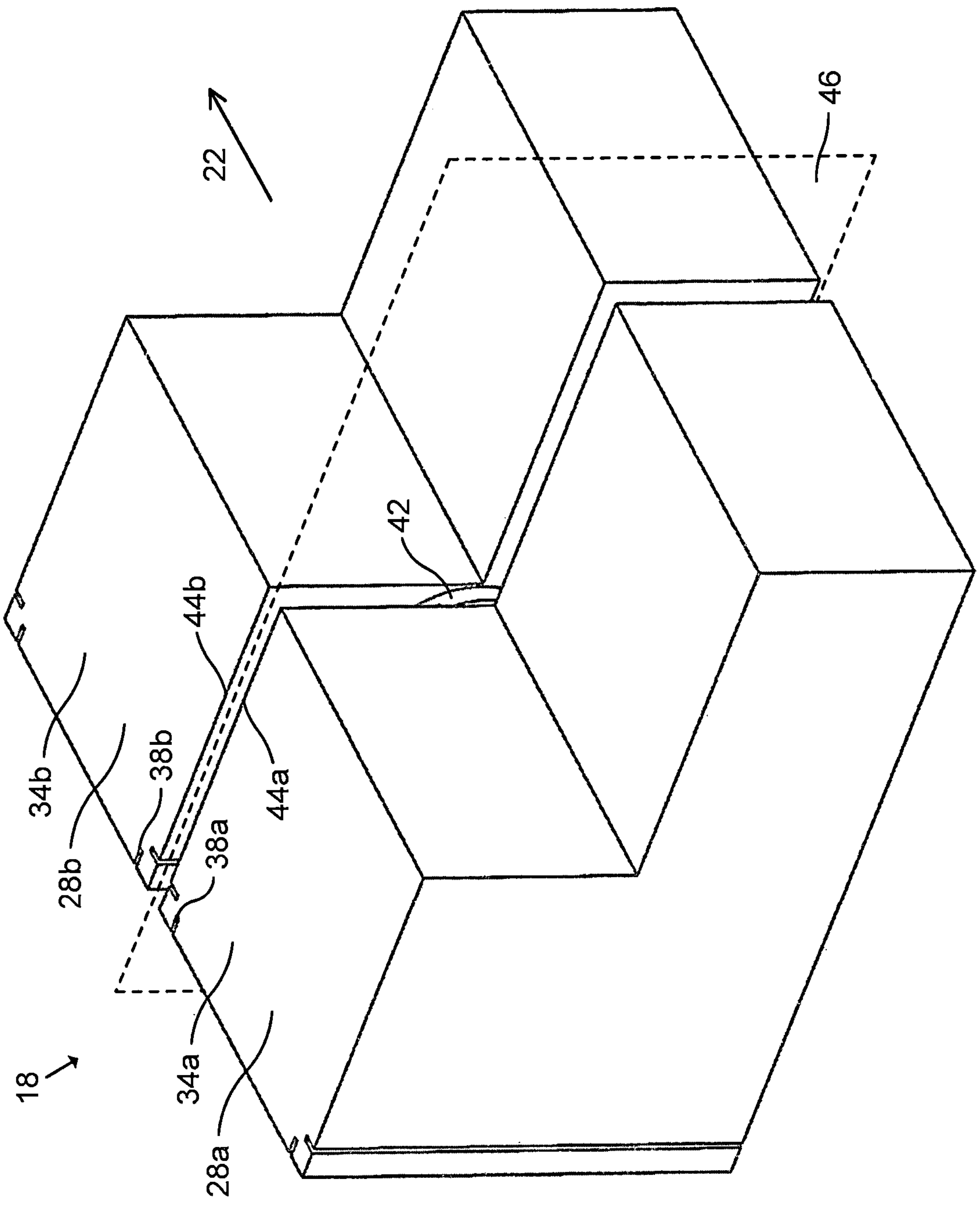
FIG. 3 schematically represents a perspective view of one of the battery pack systems in FIG. 2 comprising a first battery pack and a second battery pack according to one example.

FIG. 3 schematically represents a perspective view of the battery pack system 18 in FIG. 2. The battery pack system 18 comprises a coupling 42. The coupling 42 is positioned between the first battery pack 28*a* and the second battery pack 28*b*.

FIG. 3 further shows that the first casing 34*a* comprises a first wall 44*a* and the second casing 34*b* comprises a second wall 44*b*. In this example, the first wall 44*a* and the second, wall 44*b* are parallel and facing each other. The coupling 42 is here fixed to each of the first wall 44*a* and the second wall 44*b*. A mating interface 46 is defined between the first wall 44*a* and the second wall 44*b*. The mating interface 46 is here illustrated as a plane parallel with each of the first wall 44*a* and the second wall 44*b*.

The coupling 42 is configured to transfer torques and translational forces between the first battery pack 28*a* and the second battery pack 28*b*. The coupling 42 may prevent any relative rotations between the first battery pack 28*a* and the second battery pack 28*b* in the mating interface 46 and any relative translational movements in the mating interface 46 between the first battery pack 28*a* and the second battery pack 28*b*. In this way, the coupling 42 may contribute to efficiently preventing relative movements between the first battery pack 28*a* and the second battery pack 28*b*.

Figure 4:
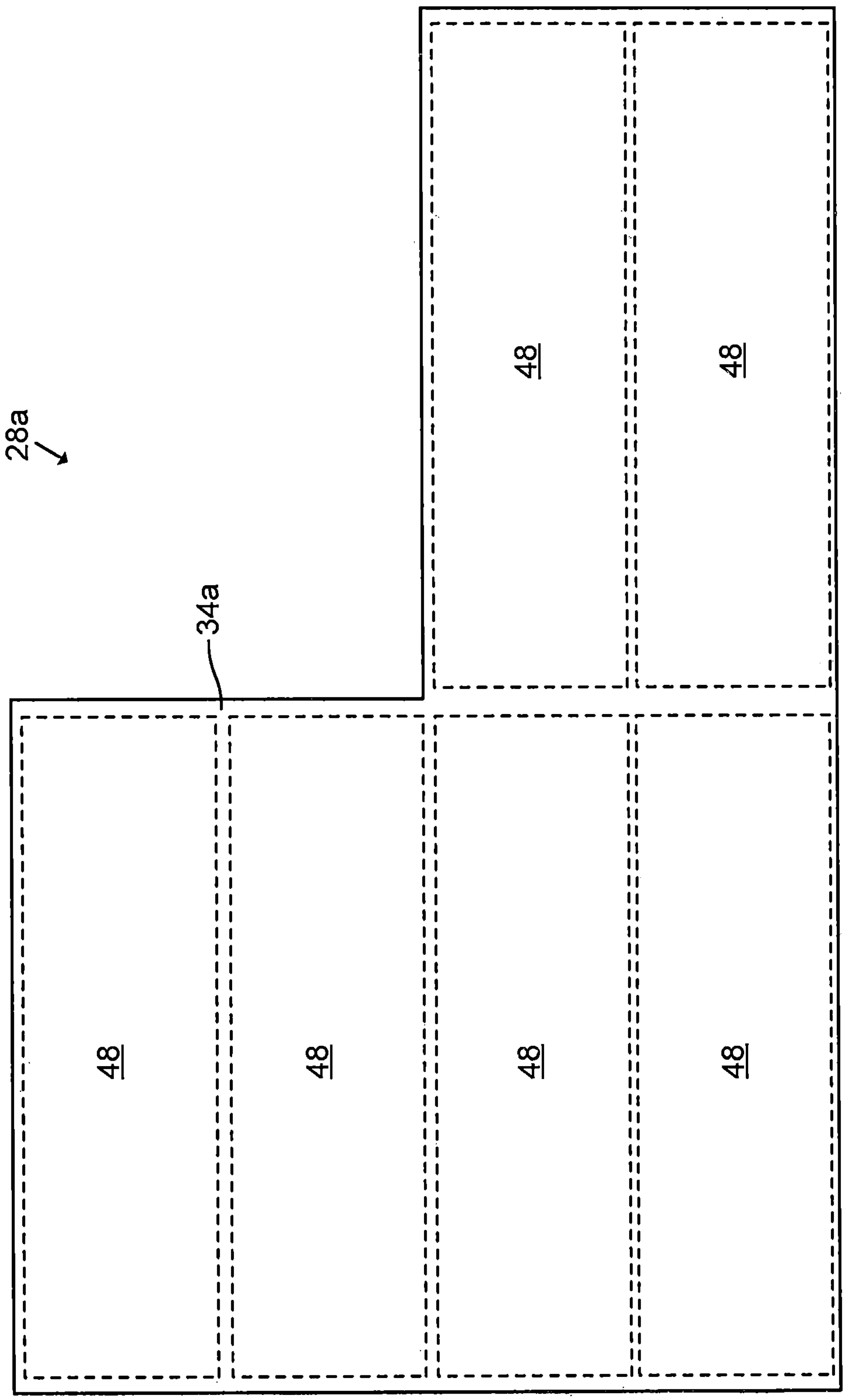
FIG. 4 schematically represents a rear view of the battery pack system in FIG. 3 according to one example.

FIG. 4 schematically represents a rear view of the battery pack system 18 in FIG. 3 according to one example. As shown, the first battery pack 28*a* comprises a plurality of battery modules 48, here six battery modules 48. The battery modules 48 are arranged inside the first casing 34*a*. The second casing 34*b* also contains a plurality of battery modules 48 in the same way as the first casing 34*a*. With regard to the battery modules 48, the first battery pack 28*a* and the second battery pack 28*b* may be of the same design. Each battery module 48 may comprise a plurality of battery cells connected in series, such as at least 1000 battery cells. The voltage of each cell may for example be 3.5 V.

Figure 5:
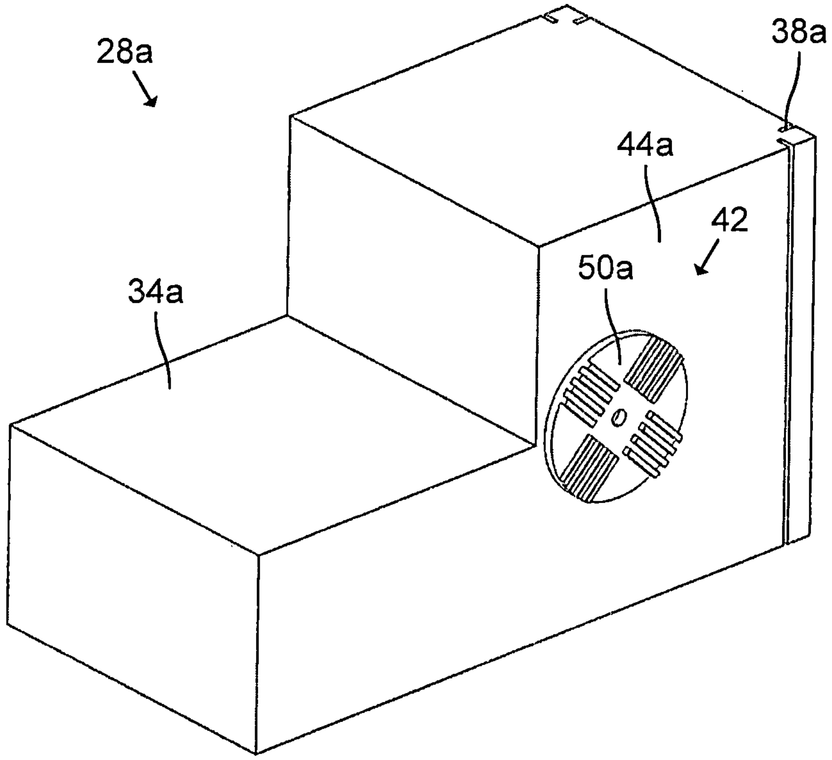
FIG. 5 schematically represents a perspective view of the first battery pack comprising a first coupling member according to one example.

FIG. 5 schematically represents a perspective view of the first battery pack 28*a*. As shown in FIG. 5, the coupling 42 comprises a first coupling member 50*a*. The first coupling member 50*a* is fixed to the first wall 44*a*.

Figure 6:
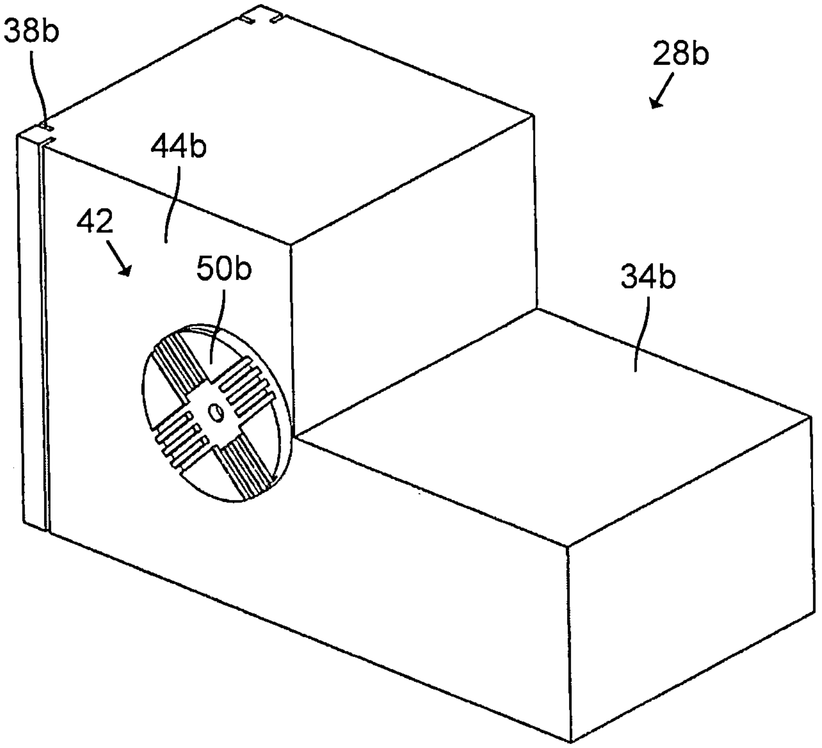
FIG. 6 schematically represents a perspective view of the second battery pack comprising a second coupling member according to one example.

FIG. 6 schematically represents a perspective view of the second battery pack 28*b*. As shown in FIG. 6, the coupling 42 comprises a second coupling member 50*b*. The second coupling member 50*b* is fixed to the second wall 44*b*. The second coupling member 50*b* is configured to mate with the first coupling member 50*a*. When the first coupling member 50*a* and, the second coupling member 50*b* are mated, torques and translational forces can be transferred between the first battery pack 28*a* and the second battery pack 28*b*. The second coupling member 50*b* is here configured to mate with the first coupling member 50*a* in the mating interface 46 such that torques and translational forces can be transferred through the mating interface 46. In this example, the first coupling member 50*a* is configured to engage the second coupling member 50*b* by an interference fit.

As shown in FIGS. 5 and 6, the first coupling member 50*a* may only occupy a relatively small area on the first wall 44*a* and the second coupling member 50*b* may only occupy a relatively small area on the second wall 44*b*. The coupling 42 thus has a compact design. Since the coupling 42 may be provided to the battery pack system 18 by only attaching the first coupling member 50*a* to the first casing 34*a* and attaching the second coupling member 50*b* to the second casing 34*b*, the coupling 42 may be provided in a simple and cost efficient manner.

Figure 7:
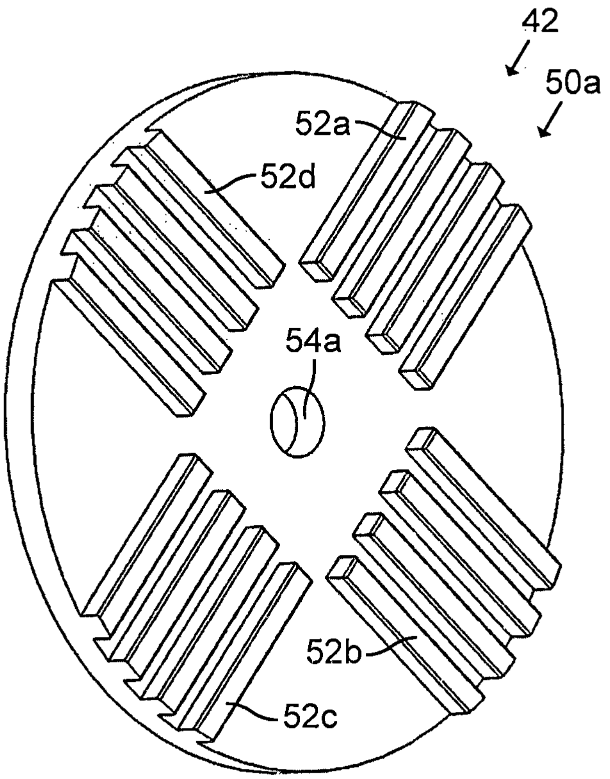
FIG. 7 schematically represents a perspective view of the first coupling member according to one example.

FIG. 7 schematically represents a perspective view of the first coupling member 50*a* according to one example. The first coupling member 50*a* comprises a plurality of ridges, in this example a plurality of (here four) first ridges 52*a*, a plurality of (here four) second ridges 52*b*, a plurality of (here four) third ridges 52*c* and a plurality of (here four) fourth ridges 52*d*. One, several or all of the ridges 52*a*-52*d* may also be referred to with reference numeral "52". Each ridge 52 is here exemplified as having a straight and elongated shape. The first coupling member 50*a* is here exemplified as a circular disc where the ridges 52 protrude from the disc. The first coupling member 50*a* of this example is thus a male coupling member.

In this example, each ridge 52 is parallel with the first wall 44*a*. The first ridges 52*a* are parallel with each other, and also parallel with the third ridges 52*c*. The second ridges 52*b* are parallel with each other and also parallel with the fourth ridges 52*d*. The first ridges 52*a* are perpendicular to the second ridges 52*b*, i.e. angled 90 degrees relative to each other.

The first coupling member 50*a* further comprises a first through hole 54*a*. The first through hole 54*a* is centered on the first coupling member 50*a*.

Figure 8:
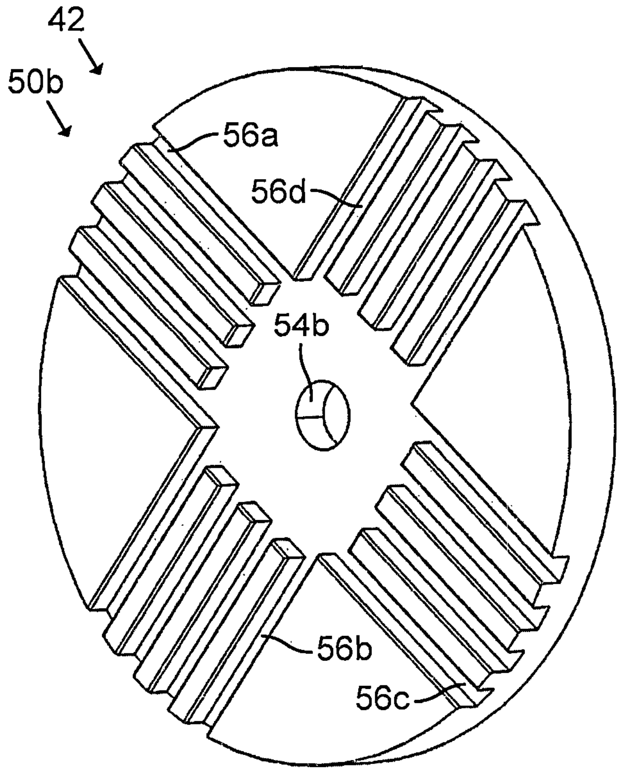
FIG. 8 schematically represents a perspective view of the second coupling member according to one example.

FIG. 8 schematically represents a perspective view of the second coupling member 50*b* according to one example. The second coupling member 50*b* comprises a plurality of splines, in this example a plurality of (here four) first splines 56*a*, a plurality of (here four) second splines 56*b*, a plurality of (here four) third splines 56*c* and a plurality of (here four) fourth splines 56*d*. One, several or all of the splines 56*a*-56*d* may also be referred to with reference numeral "56". The splines 56 have a layout on the second coupling member 50*b* corresponding to a layout of the ridges 52 on the first coupling member 50*a*. Each spline 56 is here exemplified as having a straight and elongated shape. Moreover, each spline 56 is parallel with the second wall 44*b*. The second coupling member 50*b* is here exemplified as a circular disc where the splines 56 form apertures in the disc. The second coupling member 50*b* of this example is thus a female coupling member.

The second coupling member 50*b* further comprises a second through hole 54*b*. The second through hole 54*b* is centered on the second coupling member 50*b*. Due to the first through hole 54*a* and the second through hole 54*b*, the coupling 42 is hollow.

Each spline 56 is configured to receive a unique ridge 52 when the first coupling member 50*a* mates with the second coupling member 50*b*. Each of the first coupling member 50*a* and the second coupling member 50*b* may be a rigid element prior to attachment to the first wall 44*a* and the second wall 44*b*, respectively, for example integrally formed from a single piece of material.

Since only one coupling member may be provided on each of the battery packs, i.e. the first coupling member 50*a* on the first battery pack 28*a* and the second coupling member 50*b* on the second battery pack 28*b*, the first coupling member 50*a* may be displaced slightly relative to an intended mounting position on the first wall 44*a* and/or the second coupling member 50*b* may be displaced slightly relative to an intended mounting position on the second wall 44*b* without preventing docking of the first battery pack 28*a* to the second battery pack 28*b*. In the above example using pairs of holes and pins in contrast, displacement of only one of the pairs and pins may prevent docking of two battery packs. The coupling 42 may therefore make the battery pack system 18 less sensitive to tolerance variations.

Figure 9:
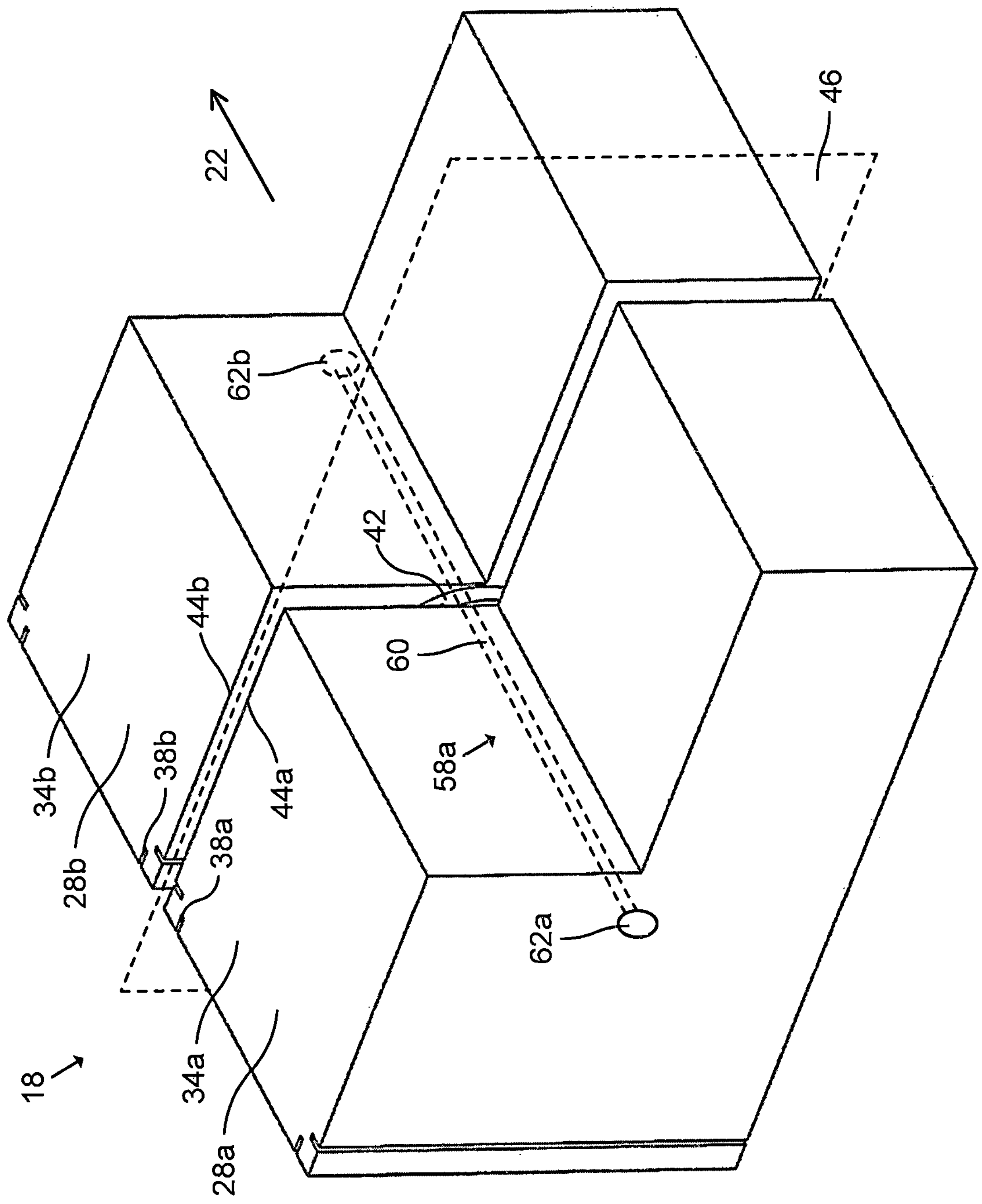
FIG. 9 schematically represents a perspective view of a battery pack system comprising a lock device according to one example.

FIG. 9 schematically represents a perspective view of the battery pack system 18 comprising a lock device 58*a* according to one example. The lock device 58*a* of this example comprises a rod 60, a first clamping element 62*a* and a second clamping element 62*b*. The rod 60 is one example of an elongated element according to the disclosure. The rod 60 passes through each of the first through hole 54*a* and the second through hole 54*b* of the coupling 42. The rod 60 also passes through each of the first battery pack 28*a* and the second battery pack 28*b*. The rod 60 may for example pass between battery modules 48 in each of the first battery pack 28*a* and the second battery pack 28*b*.

In this example, the first clamping element 62*a* is positioned outside the first battery pack 28*a* and the second clamping element 62*b* is positioned outside the second battery pack 28*b*. That is, the first battery pack 28*a* is positioned between the first clamping element 62*a* and the coupling 42, and the second battery pack 28*b* is positioned between the second clamping element 62*b* and the coupling 42. In this example, the first clamping element 62*a* contacts and engages the first casing 34*a* and the second clamping element 62*b* contacts and engages the second casing 34*b*. The lock device 58*a* thereby prevents separation between the first coupling member 50*a* and the second coupling member 50*b*.

One or both of the first clamping member 62*a* and the second clamping member 62*b* may threadingly engage the rod 60. By tightening the first clamping member 62*a* and/or the second clamping member 62*b*, tension can be introduced in the rod 60.

When the first coupling member 50*a* mates with the second coupling member 50*b*, tension may be introduced in the rod 60 to clamp the first coupling member 50*a* and the second coupling member 50*b* together, i.e. to pull the first battery pack 28*a* and the second battery pack 28*b* together. As a consequence, the coupling 42 may prevent relative rotation between the first battery pack 28*a* and the second battery pack 28*b* in the mating interface 46 and may prevent any translational movement between the first battery pack 28*a* and the second battery pack 28*b* in the mating interface 46. Since the clamping force introduced in the rod 60 is centered with respect to the first coupling member 50*a* and the second coupling member 50*b*, the clamping force does not cause any tilting of the first coupling member 50*a* and the second coupling, member 50*b*. A stable clamping of the coupling 42 may thereby be accomplished. Thus, the first battery pack 28*a* and the second battery pack 28*b* are firmly held together and any relative movements therebetween may be efficiently prevented. The coupling 42 may thus enable the battery pack system 18 to form a rigid package with a fast assembly and a cost-efficient structure. When the battery pack system 18 is a rigid package, installation of the battery pack system 18 on the rail 24 is facilitated.

Mating of only the first coupling member 50*a* and the second coupling member 50*b* may also be much easier to accomplish than a simultaneous mating of a plurality of pairs of holes and pins, in particular since the first battery pack 28*a* and the second battery pack 28*b* may have a considerable mass.

In order to dock the first battery pack 28*a* to the second battery pack 28*b*, e.g. prior to clamping using the lock device 58*a*, the first battery pack 28*a* and the second battery pack 28*b* may be positioned on a table, such as on a slide table, and pushed together such that the first coupling member 50*a* and the second coupling member 50*b* mate with each other to provide the assembled battery pack system 18. The assembly of the battery pack system 18 may be made outside a main assembly line for the truck 10. The rod 60 may then be inserted through the first battery pack 28*a*, through the coupling 42 and through the second battery pack 28*b*. The first clamping element 62*a* and the second clamping element 62*b* may then be threaded onto the rod 60 and tightened to introduce tension in the rod 60. The battery pack system 18 may then be moved, such as lifted by a crane, to a main assembly line for the truck 10 where the battery pack system 18 is installed on the rail 24. The coupling 42 enables all surfaces of the first battery pack 28*a* and the second battery pack 28*b* to be kept aligned despite the battery pack system 18 being subjected to vibrations during travel of the truck 10.

Figure 10:
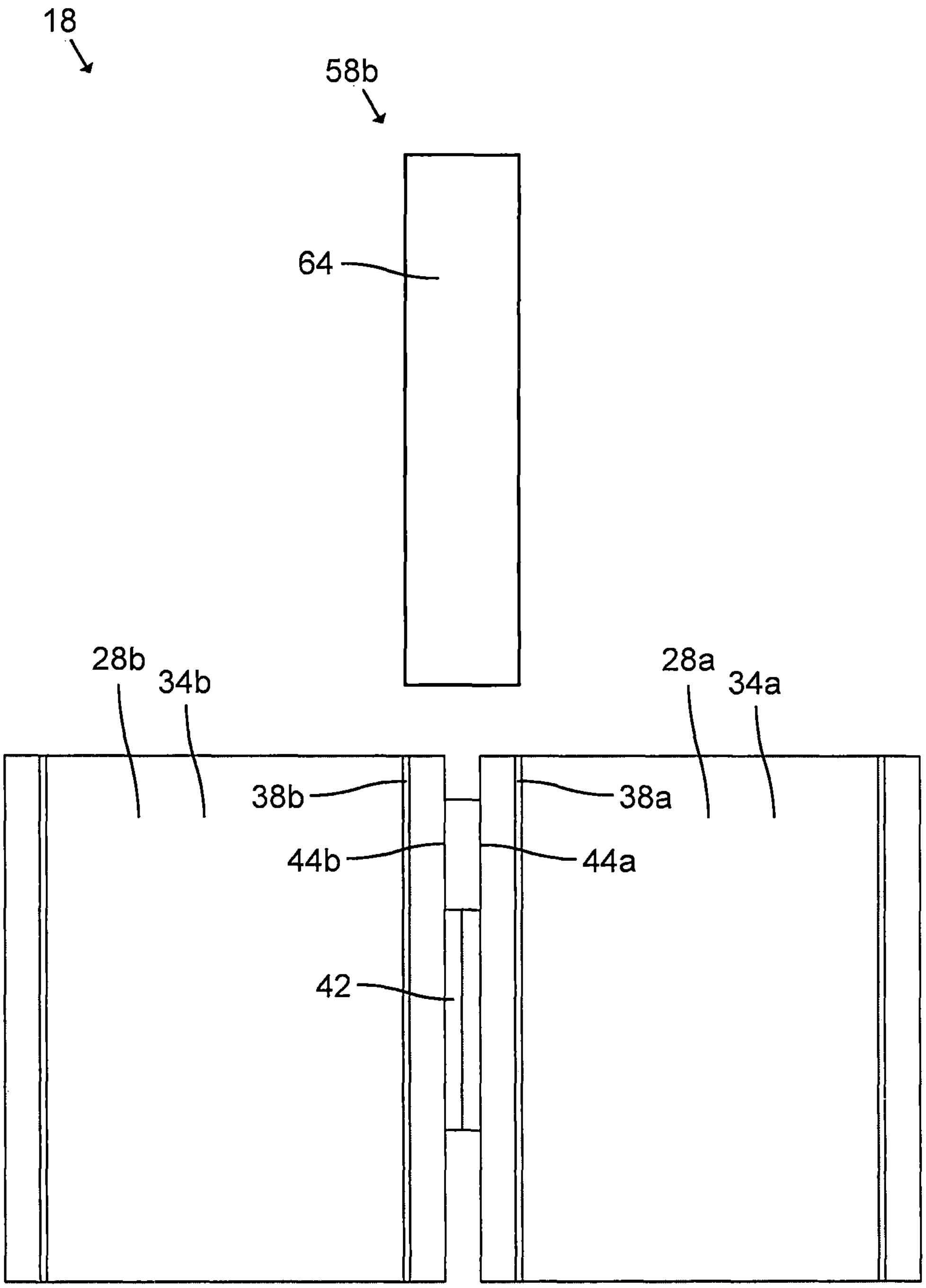
FIG. 10 schematically represents a side view of a battery pack system comprising a lock device according to another example prior to installation of the lock device.

FIG. 10 schematically represents a side view of a battery pack system 18 comprising a lock device 58*b* according to another example prior to installation of the lock device 58*b*. The lock device 58*b* of this example comprises an elongated locking profile 64. The locking profile 64 is configured to engage each of the first engageable structure 38*a* and the second engageable structure 38*b*. The locking profile 64 of this specific and non-limiting example is an extruded aluminum profile having a constant cross-sectional profile along its entire length.

Figure 11:
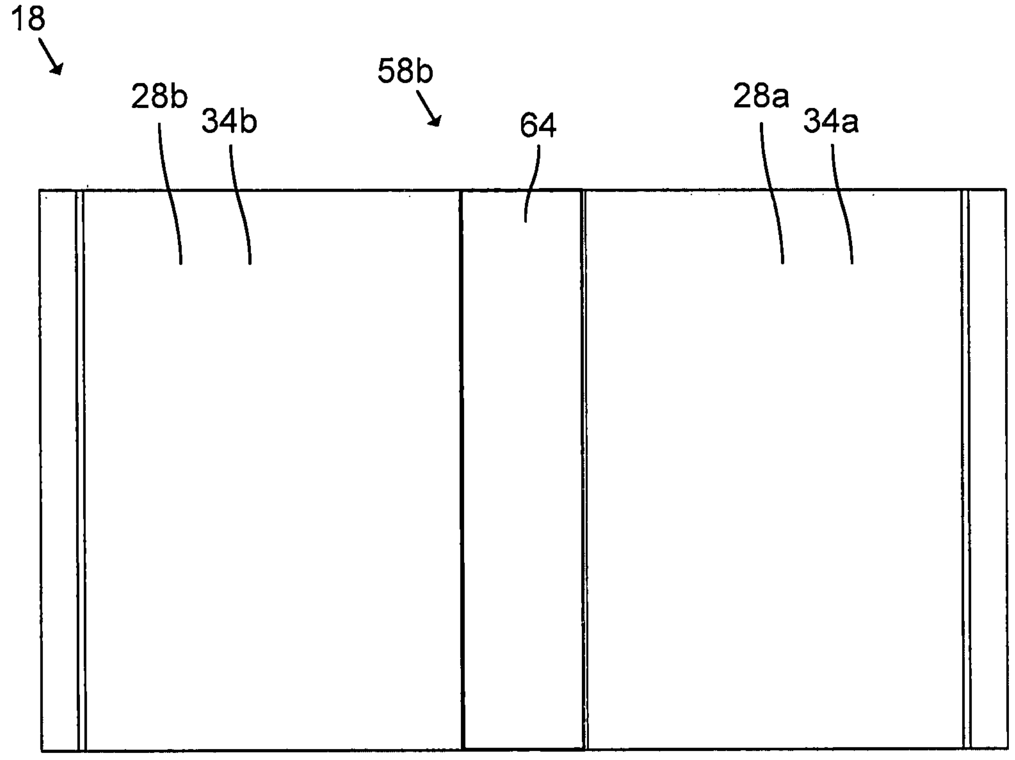
FIG. 11 schematically represents a side view of the battery pack system in FIG. 10 when the lock device is installed according to one example.
Figure 12:
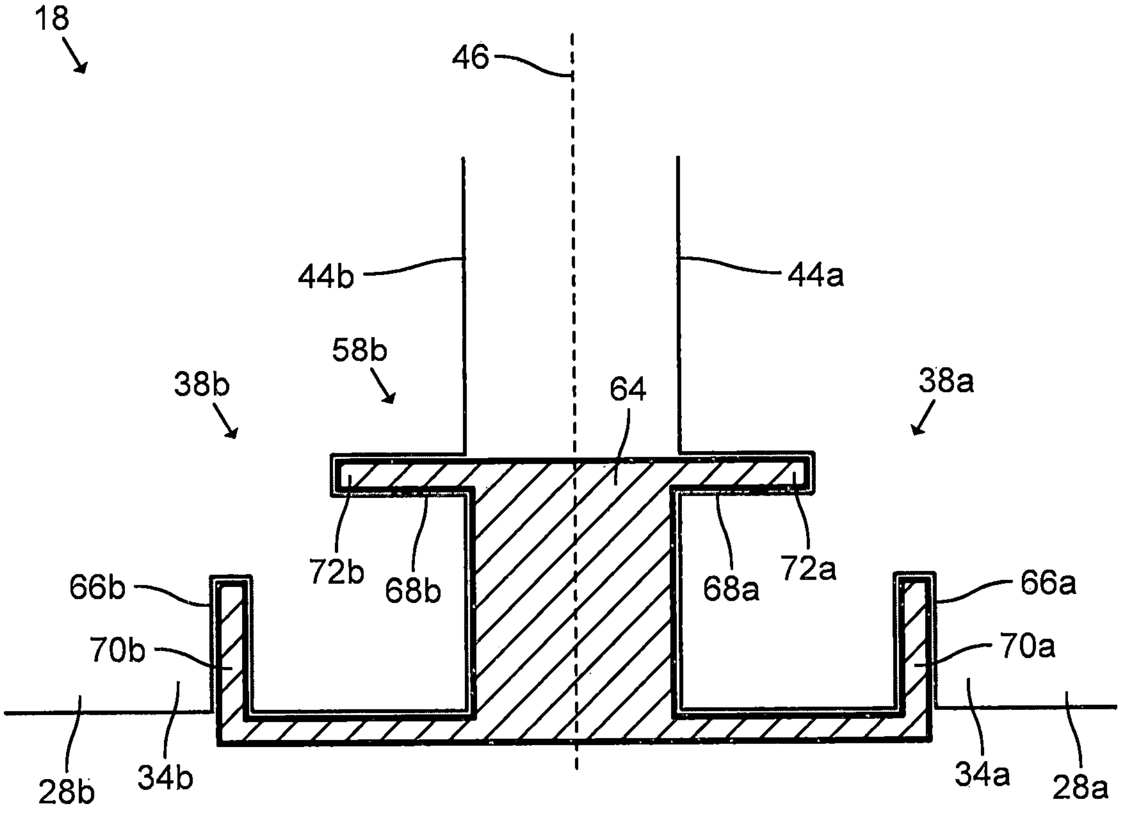
FIG. 12 schematically represents a top view of the battery pack system in FIG. 11.

FIG. 11 schematically represents a side view of the battery pack system 18 in FIG. 10 when the lock device 58*b* is installed, and FIG. 12 schematically represents a top view of the battery pack system 18 in FIG. 11. As shown in FIG. 12, the first engageable structure 38*a* of this example comprises a first locking slot 66*a* and a first guiding slot 68*a*, and the second engageable structure 38*b* of this example comprises a second locking slot 66*b* and a second guiding slot 68*b*. The first locking slot 66*a* and the second locking slot 66*b* are parallel with the mating interface 46. The first guiding slot 68*a* and the second guiding slot 68*b* are perpendicular to the mating interface 46.

The locking profile 64 comprises a first locking part 70*a* and a second locking part 70*b*, here parallel with the first locking part 70*a*. When the first locking part 70*a* is received in the first locking slot 66*a* and the second locking part 70*b* is received in the second locking slot 66*b* as shown in FIG. 12, separation of the first battery pack 28*a* and the second battery pack 28*b* is prevented by the locking profile 64.

The locking profile 64 of this example further comprises a first guiding part 72*a* and a second guiding part 72*b*, here lying in the same plane as the first guiding part 72*a*. When the first guiding part 72*a* engages the first guiding slot 68*a* and the second guiding part 72*b* engages the second guiding slot 68*b* as shown in FIG. 12, the locking profile 64 is held stably in a position preventing separation between the first coupling member 50*a* and the second coupling member 50*b*.

In FIGS. 11 and 12, the locking profile 64 has been slid vertically downwards while engaging the first locking slot 66*a*, the second locking slot 66*b*, the first guiding slot 68*a* and the second guiding slot 68*b*. In this way, the locking profile 64 contacts and engages each of the first casing 34*a* and the second casing 34*b* via the first engageable structure 38*a* and the second engageable structure 38*b*, respectively. As a consequence, the lock device 58*b* prevents separation between the first coupling member 50*a* and the second coupling member 50*b*. The locking profile 64 can be installed in the battery pack system 18 very easily, for example by manual insertion.

Figure 13:
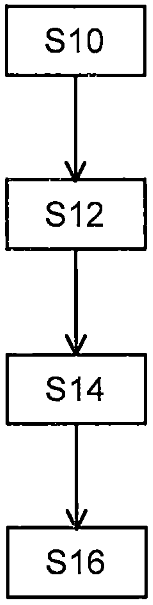
FIG. 13 is a flowchart outlining general steps of a method according to one example.

FIG. 13 is a flowchart outlining general steps of a method according to one example. The method comprises providing S10 a first battery pack 28*a* including a first casing 34*a* and a plurality of battery modules 48 arranged inside the first casing 34*a*. The method further comprises providing S12 a second battery pack 28*b* including a second casing 34*b* and a plurality of battery modules 48 arranged inside the second casing 34*b*. The method further comprises providing S14 a coupling 42 including a first coupling member 50*a* fixed to the first casing 34*a*, and a second coupling member 50*b* fixed to the second casing 34*b*, the coupling 42 being configured to transfer torques and translational forces when the first coupling member 50*a* mates with the second coupling member 50*b*. The method further comprises moving S16 the first casing 34*a* relative to the second casing 34*b* such that the first coupling member 50*a* mates with the second coupling member 50*b*.

Figure 14:
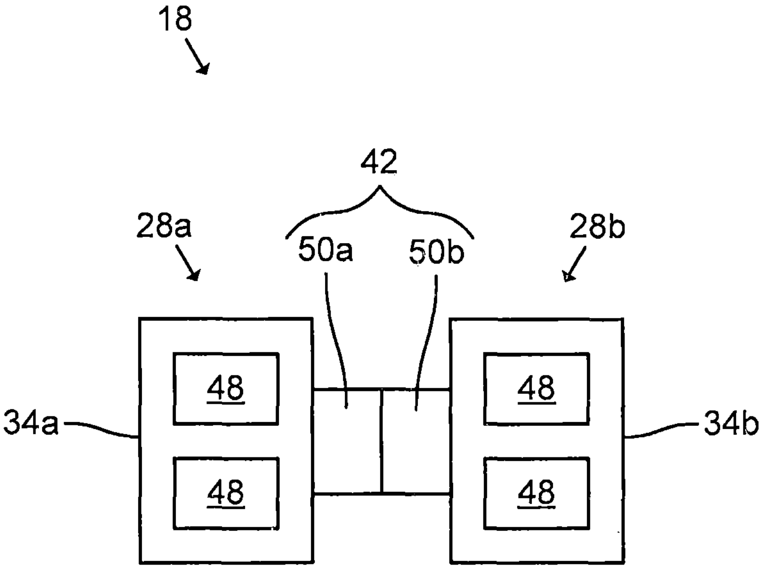
FIG. 14 is another view of FIG. 3, according to another example.

FIG. 14 is another view of FIG. 3, according to another example. FIG. 14 shows a battery pack system 18 comprising a first battery pack 28*a* including a first casing 34*a* and a plurality of battery modules 48 arranged inside the first casing 34*a*; a second battery pack 28*b* including a second casing 34*b* and a plurality of battery modules 48 arranged inside the second casing 34*b*; and a coupling 42 including a first coupling member 50*a* fixed to the first casing 34*a*, and a second coupling member 50*b* fixed to the second casing 34*b*, the first coupling member 50*a* being configured to mate with the second coupling member 50*b*; wherein the coupling 42 is configured to transfer torques and translational forces between the first battery pack 28*a* and the second battery pack 28*b*.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A battery pack system comprising:

a first battery pack including a first casing and a plurality of battery modules arranged inside the first casing;

a second battery pack including a second casing and a plurality of battery modules arranged inside the second casing; and a coupling including a first coupling member fixed to the first casing, and a second coupling member fixed to the second casing, the first coupling member being configured to mate with the second coupling member;

wherein the coupling is configured to transfer torques and translational forces between the first battery pack and the second battery pack, wherein the coupling comprises a plurality of ridges and a plurality of associated splines, and wherein each ridge is configured to mate with a unique associated spline.

2. The battery pack system according to claim 1, wherein the first casing comprises a first wall and the second casing comprises a second wall, and wherein the first coupling member is fixed to the first wall and the second coupling member is fixed to the second wall.

3. The battery pack system according to claim 1, wherein the plurality of splines comprises one or more first splines and one or more second splines angled 10 degrees to 170 degrees to the one or more first splines.

4. The battery pack system according to claim 1, wherein the first coupling member is configured to mate with the second coupling member in a mating interface.

5. The battery pack system according to claim 4, wherein the battery pack system further comprises a lock device configured to prevent separation between the first coupling member and the second coupling member, wherein the first casing comprises a first engageable structure parallel with the mating interface and the second casing comprises a second engageable structure parallel with the mating interface, and wherein the lock device comprises an elongated locking profile configured to engage each of the first engageable structure and the second engageable structure.

6. The battery pack system according to claim 1, wherein the splines are parallel with the mating interface.

7. The battery pack system according to claim 1, further comprising a lock device configured to prevent separation between the first coupling member and the second coupling member.

8. The battery pack system according to claim 7, wherein the lock device is configured to clamp the first casing and the second casing together.

9. The battery pack system according to claim 8, wherein the coupling is hollow and the lock device passes through the coupling.

10. A chassis arrangement for an electrified heavy-duty vehicle, the chassis arrangement comprises:

a chassis frame including at least one rail extending in a longitudinal direction of the electrified heavy-duty vehicle; and a battery pack system according to claim 1 connected to the at least one rail.

11. An electrified heavy-duty vehicle comprising a chassis arrangement according to claim 10.

12. A method of assembling a battery pack system, the method comprising:

providing a first battery pack including a first casing and a plurality of battery modules arranged inside the first casing;

providing a second battery pack including a second casing and a plurality of battery modules arranged inside the second casing;

providing a coupling including a first coupling member fixed to the first casing, and a second coupling member fixed to the second casing, the coupling being configured to transfer torques and translational forces when the first coupling member mates with the second coupling member, wherein the coupling comprises a plurality of ridges and a plurality of associated splines, and wherein each ridge is configured to mate with a unique associated spline; and moving the first casing relative to the second casing such that the first coupling member mates with the second coupling member.

13. The method according to claim 12, further comprising arranging a lock device to prevent separation between the first coupling member and the second coupling member.

* * * * *